United States Patent
Motamedi

(10) Patent No.: US 12,130,820 B2
(45) Date of Patent: Oct. 29, 2024

(54) PIPELINEABLE AND PARALLELIZABLE STREAMING PARSERS FOR QUERYING STRUCTURED DATA-INTERCHANGE INFORMATION

(71) Applicant: ServiceNow, Inc., Santa Clara, CA (US)

(72) Inventor: Khosrow Jian Motamedi, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/055,137

(22) Filed: Nov. 14, 2022

(65) Prior Publication Data
US 2023/0082829 A1    Mar. 16, 2023

Related U.S. Application Data

(63) Continuation of application No. 17/443,610, filed on Jul. 27, 2021, now Pat. No. 11,537,620, which is a continuation of application No. 16/591,334, filed on Oct. 2, 2019, now Pat. No. 11,086,879.

(51) Int. Cl.
G06F 16/2455    (2019.01)
G06F 16/248    (2019.01)

(52) U.S. Cl.
CPC ...... *G06F 16/24568* (2019.01); *G06F 16/248* (2019.01)

(58) Field of Classification Search
CPC .................. G06F 16/24568; G06F 16/248
See application file for complete search history.

(56) References Cited

U.S. PATENT DOCUMENTS

| 6,609,122 B1 | 8/2003 | Ensor |
| 6,816,898 B1 | 11/2004 | Scarpelli |
| 7,020,706 B2 | 3/2006 | Cates |

(Continued)

OTHER PUBLICATIONS

Hirzel Martin et al.; "Stream Query Optimization"; Encyclopedia of Bid Data Technologies, Spring International Publishing, XP093051869 (ISBN: 978-3-319-63962-8); pp. 1-9 [retrieved from internet: http://hrzels.com/martin/papers/encyc18-stream-optim.pdf].

(Continued)

*Primary Examiner* — Mark D Featherstone
*Assistant Examiner* — Kweku William Halm
(74) *Attorney, Agent, or Firm* — Fletcher Yoder, PC

(57) ABSTRACT

A computing system includes a processor and memory. The memory includes instruction code that causes the processor to generate first and second parser instances and associate the first parser and the second parser with respective first and second search queries. The processor controls the first parser to repeatedly obtain data from the data stream in blocks until the first parser finishes identifying elements in the data stream associated with its search path. The processor controls the second parser to repeatedly obtain blocks from the first parser when the blocks obtained by the first parser have not been searched by the second parser, and controls the second parser to obtain blocks from the data stream when the blocks obtained by the first parser have been searched by the second parser and the first parser has finished searching.

20 Claims, 17 Drawing Sheets

(56) References Cited

U.S. PATENT DOCUMENTS

| | | | |
|---|---|---|---|
| 7,028,301 | B2 | 4/2006 | Ding |
| 7,062,683 | B2 | 6/2006 | Warpenburg |
| 7,131,037 | B1 | 10/2006 | LeFaive |
| 7,170,864 | B2 | 1/2007 | Matharu |
| 7,350,209 | B2 | 3/2008 | Shum |
| 7,610,512 | B2 | 10/2009 | Gerber |
| 7,617,073 | B2 | 11/2009 | Trinon |
| 7,689,628 | B2 | 3/2010 | Garg |
| 7,716,353 | B2 | 5/2010 | Golovinsky |
| 7,769,718 | B2 | 8/2010 | Murley |
| 7,783,744 | B2 | 8/2010 | Garg |
| 7,890,802 | B2 | 2/2011 | Gerber |
| 7,925,981 | B2 | 4/2011 | Pourheidari |
| 7,930,396 | B2 | 4/2011 | Trinon |
| 7,945,860 | B2 | 5/2011 | Vambenepe |
| 7,966,398 | B2 | 6/2011 | Wiles |
| 8,051,164 | B2 | 11/2011 | Peuter |
| 8,224,683 | B2 | 7/2012 | Manos |
| 8,266,683 | B2 | 9/2012 | Navarrete |
| 8,402,127 | B2 | 3/2013 | Solin |
| 8,457,928 | B2 | 6/2013 | Dang |
| 8,478,569 | B2 | 7/2013 | Scarpelli |
| 8,612,408 | B2 | 12/2013 | Trinon |
| 8,674,992 | B2 | 3/2014 | Poston |
| 8,689,241 | B2 | 4/2014 | Naik |
| 8,743,121 | B2 | 6/2014 | De Peuter |
| 8,832,652 | B2 | 9/2014 | Mueller |
| 8,887,133 | B2 | 11/2014 | Behnia |
| 9,065,783 | B2 | 6/2015 | Ding |
| 9,098,322 | B2 | 8/2015 | Apte |
| 9,122,552 | B2 | 9/2015 | Whitney |
| 9,239,857 | B2 | 1/2016 | Trinon |
| 9,317,327 | B2 | 4/2016 | Apte |
| 9,363,252 | B2 | 6/2016 | Mueller |
| 9,535,737 | B2 | 1/2017 | Joy |
| 9,557,969 | B2 | 1/2017 | Sharma |
| 9,645,833 | B2 | 5/2017 | Mueller |
| 9,654,473 | B2 | 5/2017 | Miller |
| 9,766,935 | B2 | 9/2017 | Kelkar |
| 9,792,387 | B2 | 10/2017 | George |
| 9,805,322 | B2 | 10/2017 | Kelkar |
| 9,819,729 | B2 | 11/2017 | Moon |
| 2011/0296440 | A1* | 12/2011 | Laurich ............... H04L 67/1097 719/326 |
| 2011/0314019 | A1 | 12/2011 | Jimenez et al. |
| 2012/0078868 | A1 | 3/2012 | Chen et al. |
| 2012/0330908 | A1 | 12/2012 | Stowe et al. |
| 2016/0246849 | A1 | 8/2016 | Frampton et al. |
| 2017/0053025 | A1* | 2/2017 | De Sousa Webber ....................... G06F 16/335 |
| 2018/0218042 | A1* | 8/2018 | Krishnan ............ G06F 16/2455 |
| 2018/0329644 | A1* | 11/2018 | Das ....................... G06F 3/0604 |
| 2019/0095510 | A1 | 3/2019 | Cruise et al. |
| 2019/0236194 | A1 | 8/2019 | James et al. |
| 2019/0332590 | A1 | 10/2019 | Marquardt et al. |
| 2020/0025017 | A1 | 1/2020 | Boster |
| 2020/0250178 | A1 | 8/2020 | Boster et al. |

OTHER PUBLICATIONS

Office Action (Article 94(3) EPC) for European Application No. 20828381.2 dated Jun. 12, 2023; 8 pgs.

Oracle Java Documentation, "The Java™ Tutorials," Oracle's Streaming XML parser Implementation (The Java™ Tutorials > Java API for XML Processing (JAXP) > Streaming API for XML), printed from the World Wide Web Sep. 7, 2018.

JSON—Global, "JSON—Global / ServiceNow Docs", http://docs.servicenow.com/bundle/newyork-application-development/page/app-store/dev_portal/API_reference/JSON/concept/c_JSONAPI.html, printed from the World Wide Web Sep. 18, 2019.

Anonymous: "Processing Data in Apache Kafka with Structured Streaming", Apr. 26, 2017 (XP055778898); (retrieved from internet: https://databraicks.com/blog/2017/04/26/processing-data-in-apache-kafka-with-structure-streaming-in-apache-spark-2-2.html—retrieved on Feb. 23, 2021).

Nicolae Bogdan et al: "Leveraging Adaptive I/O to Optimize Collective Data Shuffling Patterns for Big Data Analytics", IEEE Transaction on parallel and Distributed Systems, IEEE Service Center, Los Alamitos, CA, US, vol. 28, No. 6, Jun. 1, 2017; pp. 1663-1674 (XP011649363).

Marcu Ovidiu-Cristian et al.: "Storage and Ingestion Systems in Support of Stream Processing: A Survey", Nov. 29, 2018 (XP055778887) (retrived from the Internet—https://hal.inra.fr/hal-01939280v2/document—retrieved on Feb. 23, 2021).

* cited by examiner

JSON FILE 800

```
{
"Person" : {
        "First Name" : "John",
        "Last Name" : "Doe",
        "Age" : 30,
        "Education" : {
                "College" : {
                        "Name" : "State U",
                        "State" : "North Dakota"
                        },
                "Degree" : "BA"
                },
        "Location" : {
                "City" : "Chicago",
                "State" : "IL",
                },
        "Phone" : [
                "123 456-7899",
                "998 765-4321"
                ]
        }
}
```

PATH STRUCTURE 802

"$.Person"
"$.Person.First Name"
"$.Person.Last Name"
"$.Person.Age"
"$.Person.Education"
"$.Person.Education.College"
"$.Person.Education.College.Name"
"$.Person.Education.College.State"

"$.Person.Education.Degree"

"$.Person.Location"
"$.Person.Location.City"
"$.Person.Location.State"

"$.Person.Phone"

CONFIGURATION FILE 804

"$.Person.First Name"
"$.Person.Last Name"
"$.Person.Age"
"$.Person.Location.City"
"$.Person.Phone"

OUTPUT FILE 806

John Doe 30 Chicago 123 456-7899 998 765-4321
*Bill Smith 42 Santa Clara 321 654-9987*

FIG. 8A

PIPELINEABLE AND PARALLELIZABLE STREAMING PARSERS FOR QUERYING STRUCTURED DATA-INTERCHANGE INFORMATION

CROSS-REFERENCE TO RELATED APPLICATION

This application is a continuation of and claims priority to U.S. patent application Ser. No. 17/443,610, filed Jul. 27, 2021, entitled "PIPELINEABLE AND PARALLELIZABLE STREAMING PARSERS FOR QUERYING STRUCTURED DATA-INTERCHANGE INFORMATION," which is a continuation of and claims priority to U.S. patent application Ser. No. 16/591,334, filed Oct. 2, 2019, and entitled, "PIPELINEABLE AND PARALLELIZABLE STREAMING PARSERS FOR QUERYING STRUCTURED DATA-INTERCHANGE INFORMATION," now U.S. Pat. No. 11,086,879, both of which are hereby incorporated by reference herein in their entirety for all purposes.

BACKGROUND

Over the last several decades, the memory size of many computing devices, such as personal computers and servers, has grown along with the capacity of networks that these devices use for communication. The representation of information in data-interchange files has accordingly evolved from memory-efficient and capacity-efficient binary encodings to less efficient text-based human-readable forms such as the Extensible Markup Language (XML), JavaScript Object Notation (JSON), and YAML (which is a recursive acronym for YAML Ain't Markup Language). These human-readable formats are commonly used for communicating information between a web browser and a web server, for example, and have the advantages of being simple to create, parse, and debug.

In situations where the amount of information to be communicated is relatively small, the information may be sent as a file. In these situations, a receiving system waits until the entire file is downloaded before processing information in the file.

In other situations, where the amount of information to be communicated is relatively large, the information may be sent as a data stream. In these situations, a receiving system may process information in the data stream as it arrives, or after a portion of the data stream has arrived, until all the data has been processed.

SUMMARY

Various streaming parser embodiments are disclosed herein that address challenges related to parsing information communicated via a data stream, and possibly other challenges. For example, performing multiple queries on information communicated via a data stream may necessitate repeating/resending the data stream multiple times (i.e., one time for each query). This can be problematic when one considers network latency, data throughput rates, possible costs of additional service requests to an external resource, and overall system performance and response times. The streaming parsers disclosed herein overcome these challenges by operating in a pipelined and/or a parallel manner to facilitate performing multiple queries on a single data stream. That is, multiple queries may be performed on information communicated via a data stream without having to repeat/resend the stream of information or having to retain the complete body of data in memory at once—prohibitive when processing large volumes of data.

The parsers may obtain access to the data stream in a pipelined and/or a parallel manner to facilitate simultaneous or near simultaneous processing of the data stream by the parsers. For example, a first parser may obtain data, streamed from a sending device, in blocks. The first parser may make the blocks available to a second parser. The second parser may in turn make the blocks available to a third parser. This arrangement may be extended to an arbitrary number of parsers.

Each parser is generally associated with a search query. The search query may correspond to text that defines a hierarchical sequence of nodes within a string of data that are of interest. An exemplary query to find the first name of all the people in a given organization may include the path "$.Person.First Name." The format could be different depending on the type of data being queried.

Multiple queries may be specified in a configuration file and assigned to different parsers by orchestration logic of a receiving device. The queries may have been previously specified by one or more users of the receiving system. In an exemplary implementation, the orchestration logic might instantiate a parser for each query. For example, the orchestration logic might instantiate ten parsers to either sequentially or simultaneously search for elements associated with ten search queries. In the latter case, the orchestration logic may instantiate ten execution threads, one for each search query.

Each parser is capable of querying arbitrarily large documents in streaming mode, collectively with an arbitrary number of queries without having to repeatedly download the stream or repeatedly reading a downloaded file. By utilizing the parser arrangement described above, N parsers can execute N queries on separate simultaneous threads to reduce overall execution time to $O(M)$, where M is the total number of characters in the stream. Without parallel execution on separate threads, execution time would be $O(M \times N)$.

Each streaming parser receives and processes the streamed data in discrete blocks. Within each parser, the receiving and parsing activities may occur in either pipelined or parallel fashion. Thus, while block 1 of N is being parsed, block i+1 of N may be received. Under most conditions, this effectively limits the memory requirements of the device that carries out the parsing to be on the order of the size of two blocks for each parser, or on the order of N for any number of parsers when the blocks are passed between the parsers by reference. As block size can be configurable, the streaming parser can operate on a device with less memory than the size of the file itself.

On systems that have sufficient memory for receiving and storing an entire file before it is parsed, the embodiments herein are still advantageous because memory utilization is reduced, thus freeing memory for other purposes. Additionally, by receiving one block while parsing another, the overall latency involved with the receiving and parsing is reduced. Thus, some of the advantages of this approach include lower memory requirements, faster processing, and the ability to operate the parser on more devices.

Accordingly, a first exemplary embodiment may involve a computing system for processing information communicated via a data stream that comprises any set of elements forming a structure per an established syntax. Each block of data read or received by a parser may contain one or more elements. The computing system includes a processor and memory. The memory is in communication with the processor and stores instruction code executable by the processor to cause the processor to perform operations that include generating instances of first and second parser. The processor further associates the first parser with a first search query and the second parser with a second search query. The processor controls the first parser to search the blocks for one or more elements that are associated with the first search query. The processor controls the second parser to search the blocks for one or more elements that are associated with the second search query. The processor controls the first parser to repeatedly obtain the blocks from the data stream until the first parser finishes searching. Further, the processor controls the second parser to repeatedly obtain the blocks from (i) the first parser when the blocks obtained by the first parser have not been searched by the second parser, and (ii) the data stream when the first parser has finished searching and all of the blocks obtained by the first parser have been searched by the second parser.

In a second exemplary embodiment, a computer-implemented method for processing information is provided. The information is represented by a data stream that comprises any set of elements forming a structure per an established syntax. Each block of data read or received by a parser contains one or more elements. The embodiment includes generating first and second parser instances. The embodiment further includes associating the first parser with a first search query and the second parser with a second search query. The embodiment further includes searching, by the first parser, the blocks for one or more elements that are associated with the first search query. The embodiment further includes searching, by the second parser, the blocks for one or more elements that are associated with the second search query. The embodiment further includes repeatedly obtaining, by the first parser, the blocks from the data stream until the first parser finishes searching. The embodiment further includes repeatedly obtaining, by the second parser, the blocks from (i) the first parser when the blocks obtained by the first parser have not been searched by the second parser, and (ii) the data stream when the first parser has finished searching and the blocks obtained by the first parser have been searched by the second parser.

In a third exemplary embodiment, an article of manufacture may include a non-transitory computer-readable medium, having stored thereon program instructions that, upon execution by a computing system, cause the computing system to perform operations in accordance with the first and/or second exemplary embodiments.

In a fourth exemplary embodiment, a system may include various means for carrying out each of the operations of the first and/or second exemplary embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8A depicts example parser-related files, in accordance with example embodiments.

DETAILED DESCRIPTION

Figure 1:
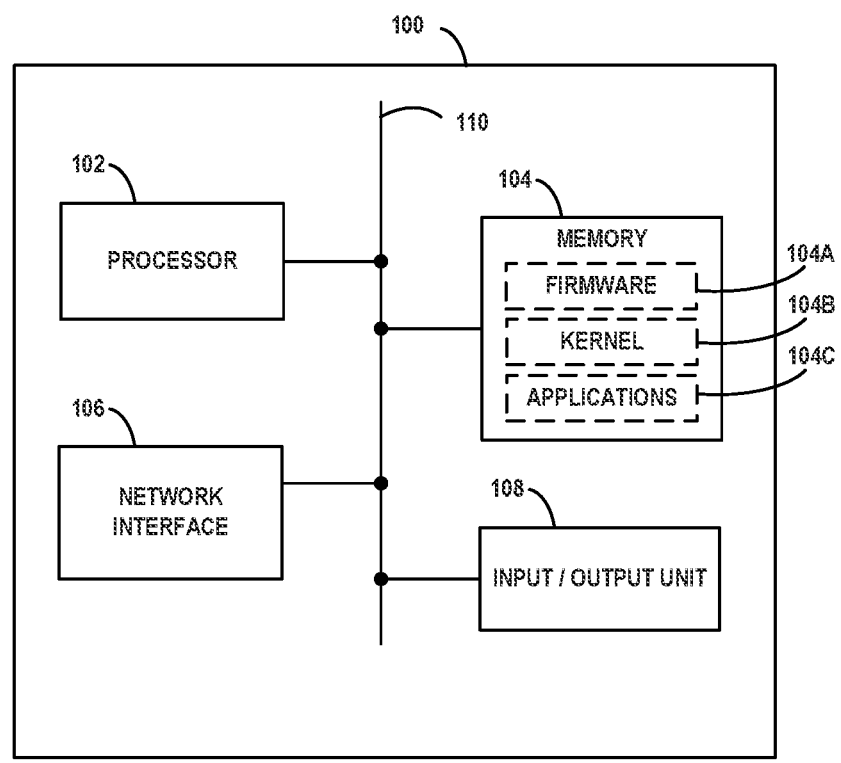
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
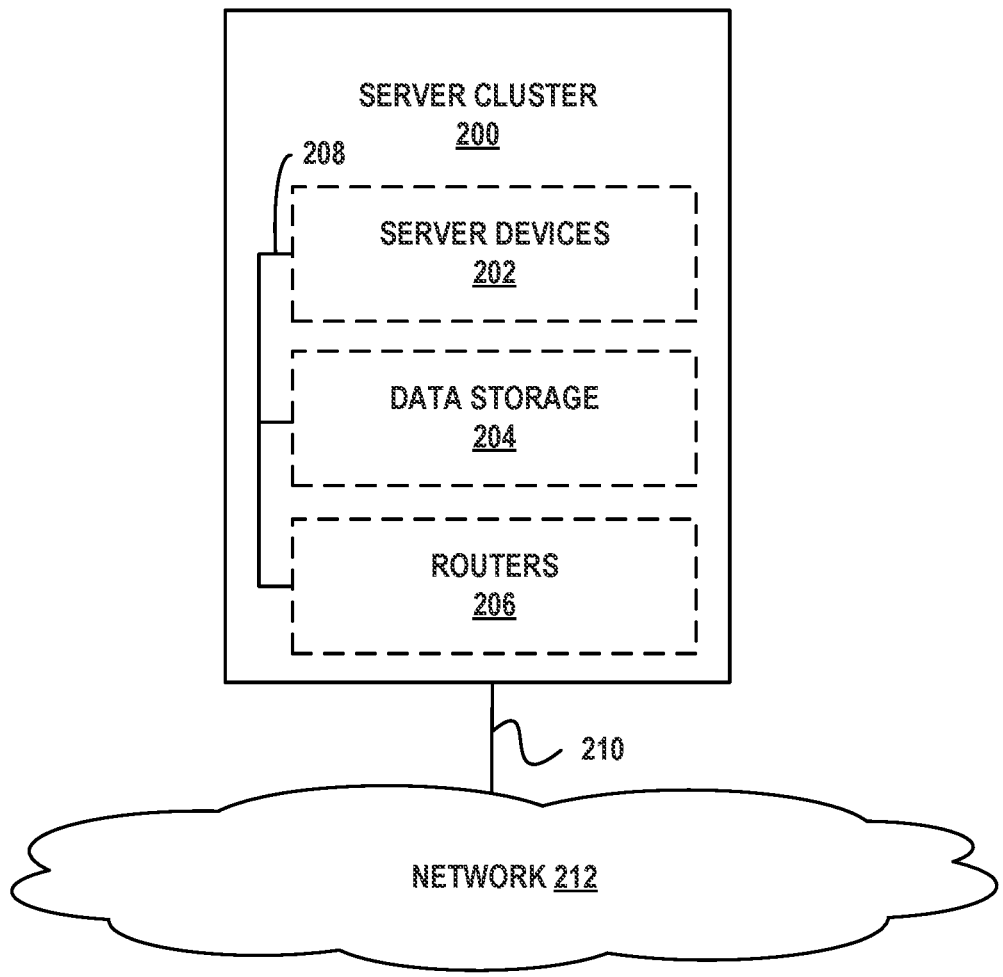
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
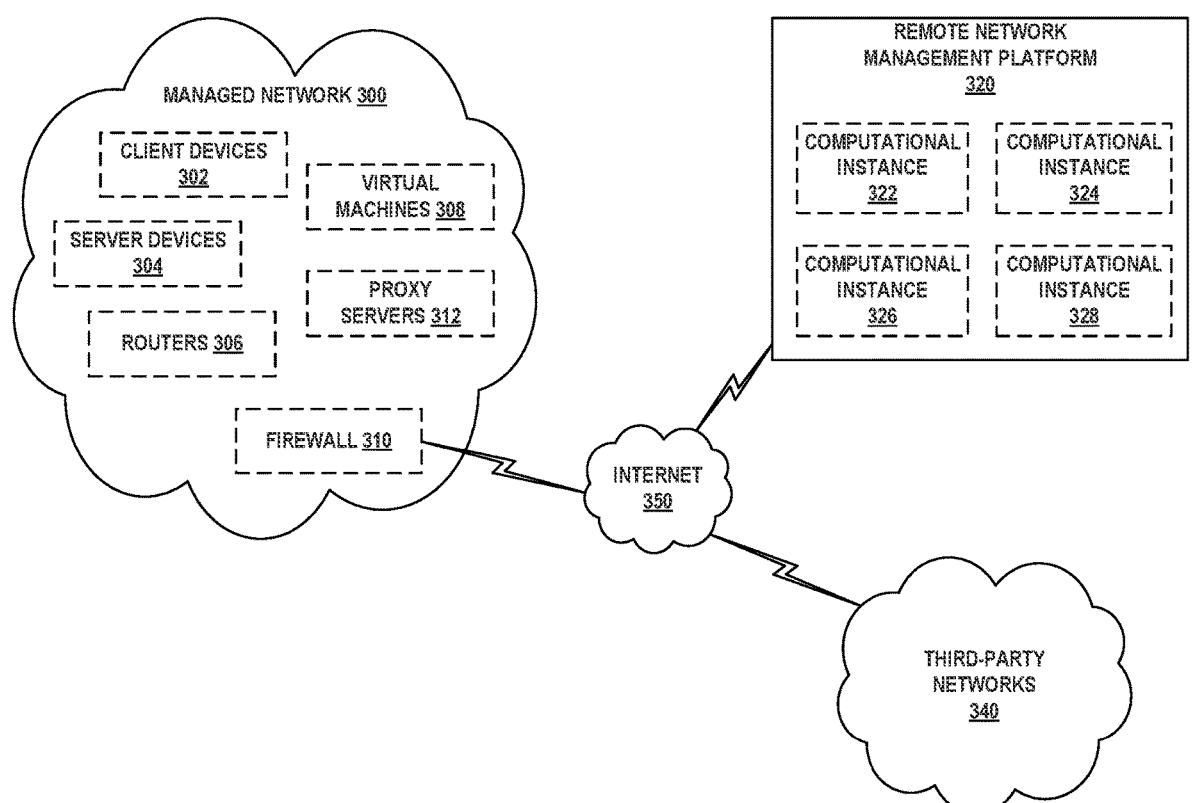
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
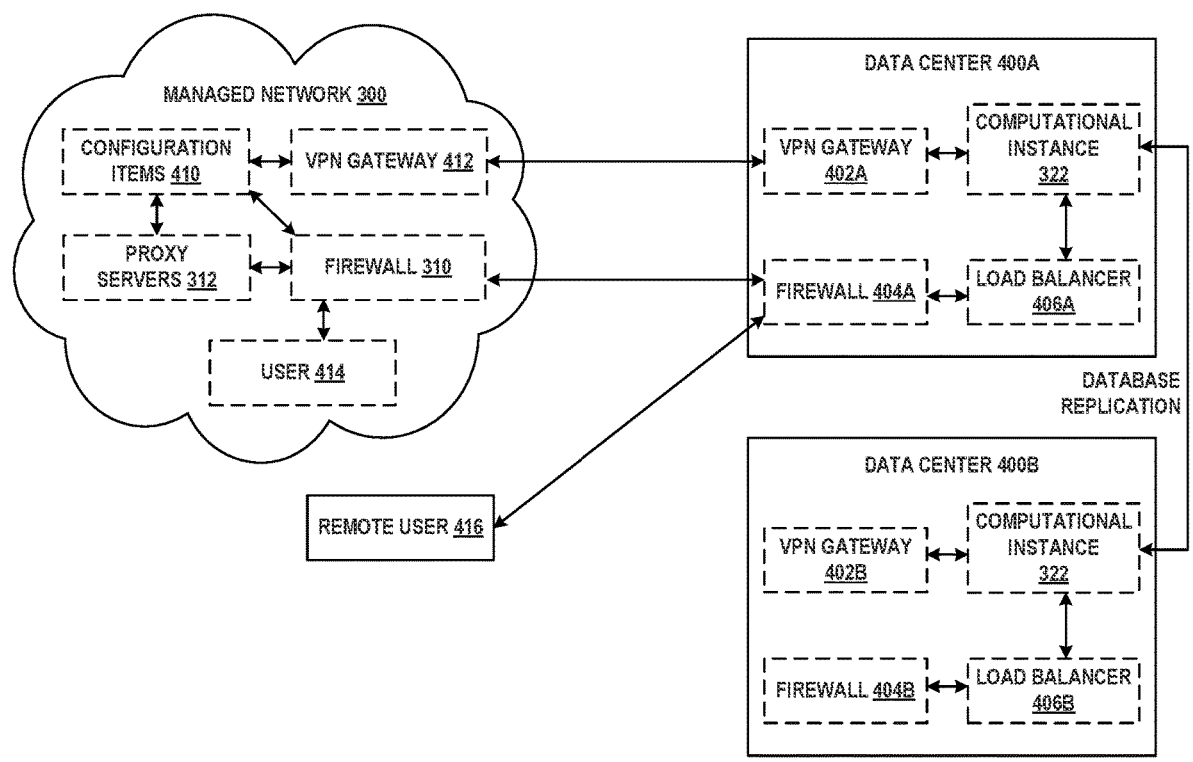
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
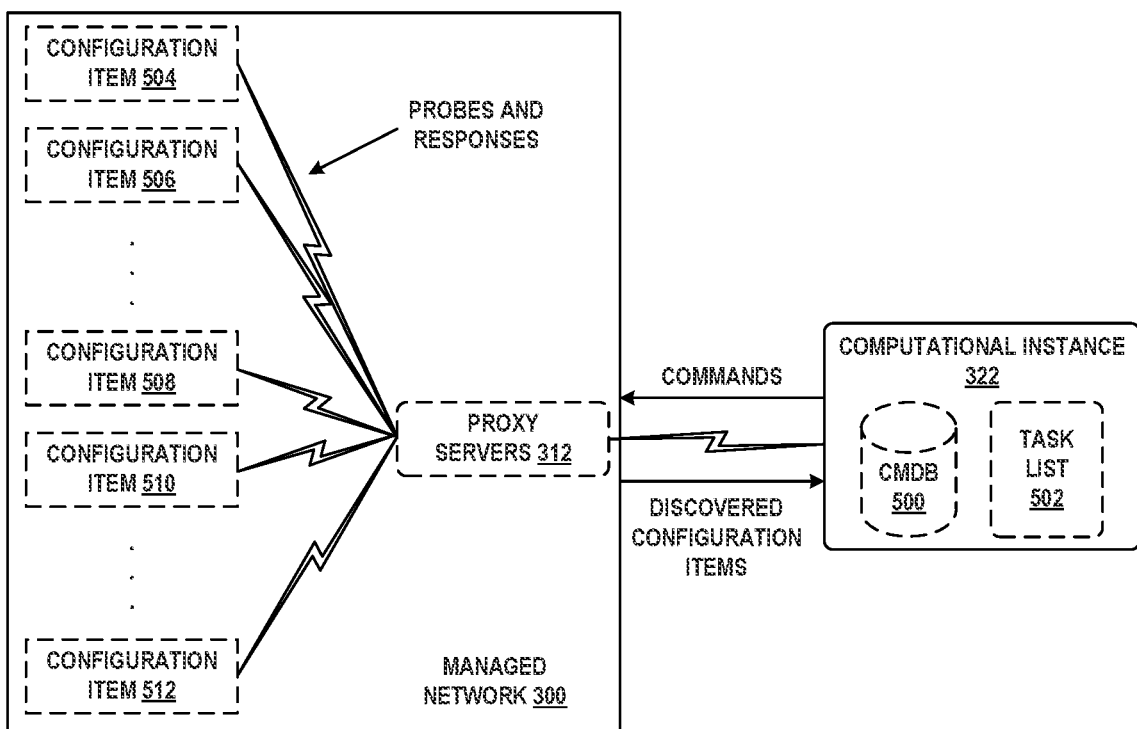
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
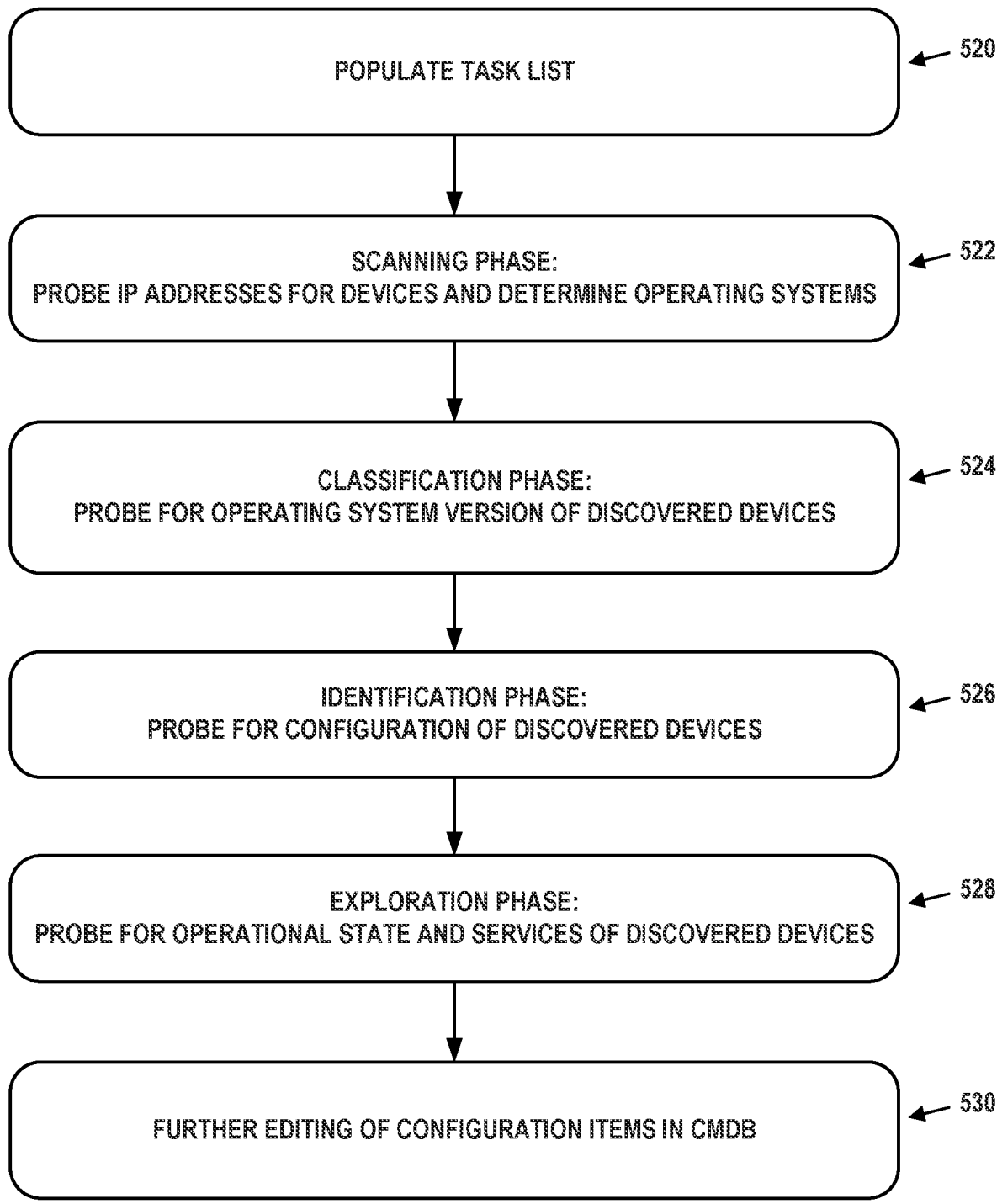
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Streaming Parser

As noted above, a streaming parser for human-readable data-interchange files can both decrease memory utilization and increase the speed at which these files are processed. An illustrative example is provided in FIG. 6.

Scenario 600 represents receiving and parsing a file. The receiving takes 5 units of time and the parsing takes 4 units of time. The parsing begins when the receiving is complete, so the processing as a whole takes 9 units of time.

Scenario 602 represents receiving and parsing the same file on a block by block basis. The file is divided into 5 blocks in this example, but divisions into more or fewer blocks may be used. After each block is received, it is parsed while the next block (if available) is received. Thus, the reception and parsing of these blocks overlaps. Advantageously, the total time needed to receive and parse the file is reduced to less than 6 units of time, representing an improvement of over 33%. Another advantage is that elements from any received block are available for further processing in real time or near real time and before the entire file is received. This is in contrast to non-streaming techniques, where these elements are not available until the entire file is received.

Furthermore, the memory required at any point in time is just slightly greater than the maximum size of a target element (buffer size), constituting the internal working buffer of the parser. The choices of block size and buffer size are independent as long as block size is no greater than buffer size. Optimal ratios between the two may be integral multiples, e.g., buffer size being 3 or 4 times the block size. Choice of block size may have no direct dependence on element size.

Figure 6:
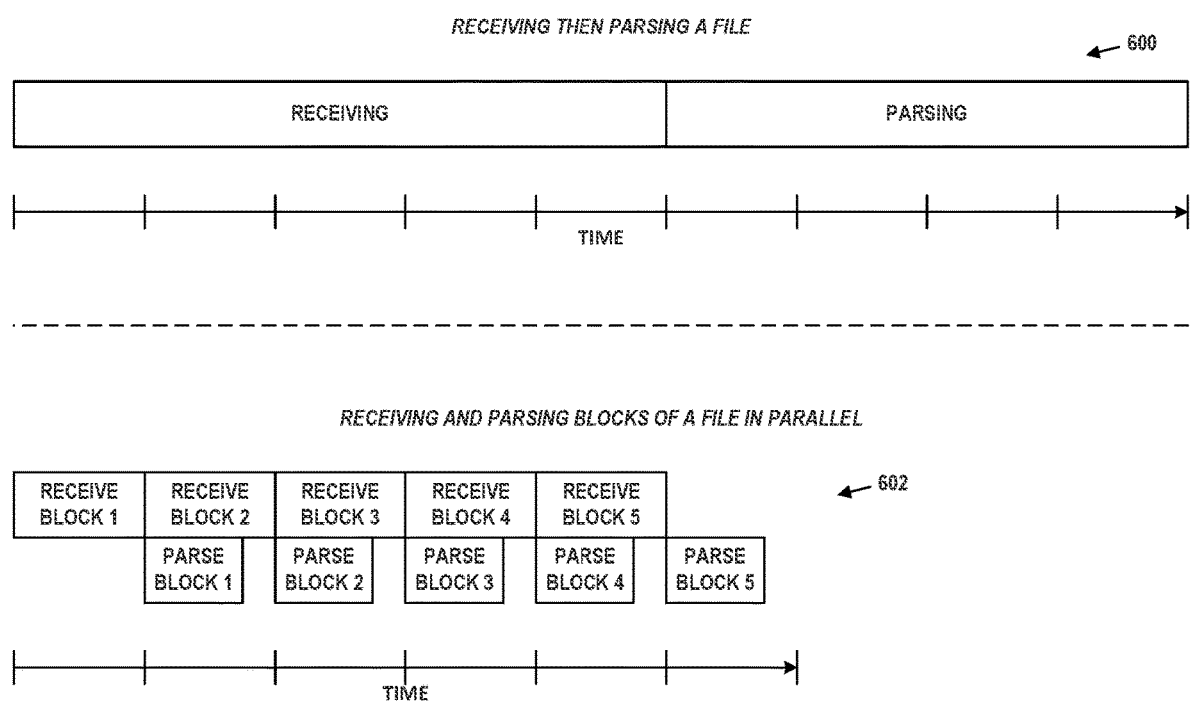
FIG. 6 depicts a timing diagram of non-streaming and streaming parsers, in accordance with example embodiments.

In FIG. 6, it is assumed that task switching time is negligible and that receiving and parsing can occur in parallel. However, even if these assumptions are lifted, the approach of scenario 602 can still dramatically reduce memory utilization. This approach is particularly helpful for computational instances of a remote network management platform, because of the memory demands that concurrent operation of multiple applications can place on these instances. But these embodiments can be used with memory-constrained devices as well, such as IOT devices.

It is also assumed that the amount of memory used in the networking stack of the receiving device can be controlled by only reading from the stack when there is application-space memory to do so, or by limiting the number and size of TCP buffers. This can result in backpressure being applied to the transmitting device (e.g., by way of TCP congestion control and avoidance algorithms) so that the rate at which the transmitting device sends data is roughly commensurate to the rate at which it can be processed by the receiving device.

VI. JavaScript Object Notation (JSON) Definition and Parsing

As noted above, the embodiments herein relate to increasing the efficiency and reducing the memory utilization of files encoded in various human-readable data-interchange formats. JSON, an example of such a format, is used herein for purpose of illustration. Nonetheless, the embodiments herein may be used with other types of formats as well. JSON is commonly used to format textual information that is communicated between a web client and web server, such as representational state transfer (REST) transactions. But JSON can also be used for inter-application communication in general, between applications on the same computing device and/or between two or more computing devices.

JSON supports recursive hierarchical nesting of objects and arrays. A JSON object is an unordered set of name/value pairs that begins with a left brace ("{") and ends with a right brace ("}"). Each name/value pair in an object is separated by a comma. JSON arrays are ordered sets of values that begin with a left bracket ("[") and end with a right bracket ("]"). The values in an array are separated by commas. Values may be character strings, numbers, Boolean values, or null values, as well as objects or arrays (thus enabling the recursive hierarchical nesting). The name part of a name/value pair is also a character string. Any amount of whitespace can be placed between these items.

Figure 7:
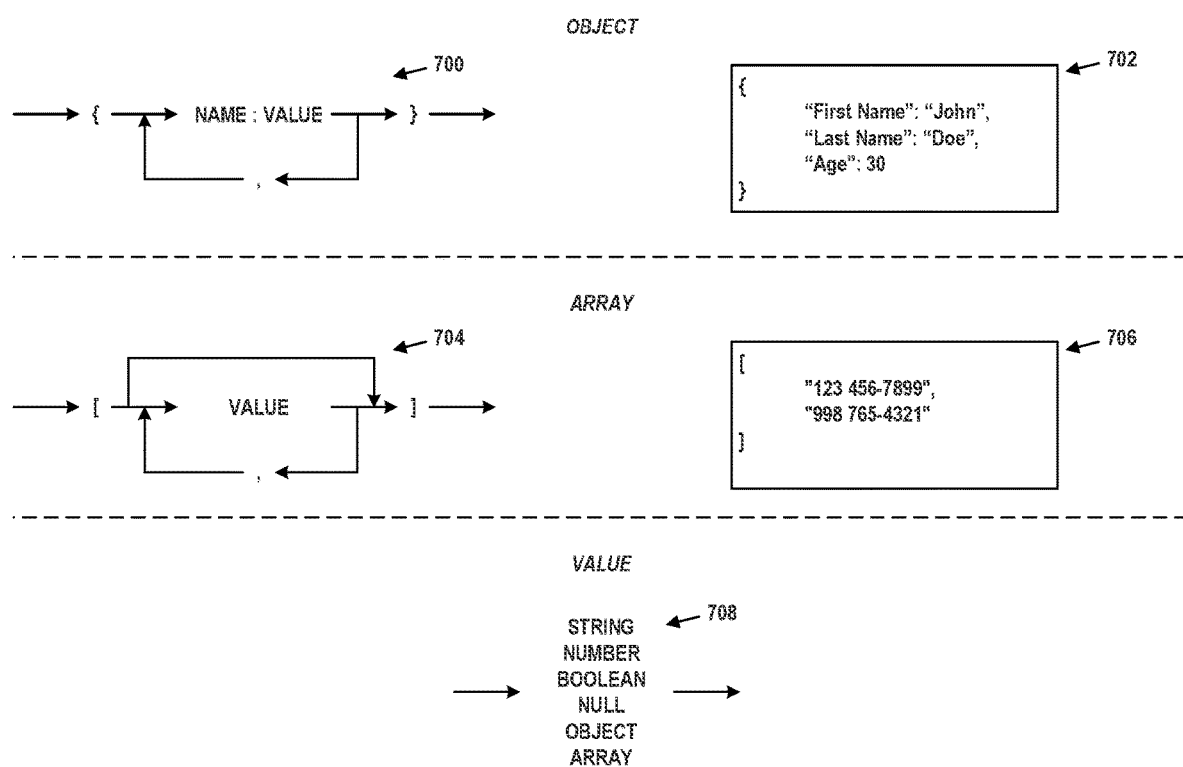
FIG. 7 depicts a definition of elements of a textual data-interchange file, in accordance with example embodiments.

FIG. 7 depicts formal language definitions and an associated example of JSON. Diagram 700 provides a formal definition of an object, diagram 704 provides a formal definition of an array, and diagram 708 provides a formal definition of a value. Example 702 is of an object containing three name/value pairs for the first name, last name and age, respectively, of an individual. Example 706 is of an array containing two values for phone numbers. Both of these examples are fully encapsulated by braces and brackets, respectively. Thus, they are completely defined and may be referred to as elements. In other words, elements in JSON files are delimited by an open brace and a corresponding close brace, or an open bracket and a corresponding close bracket. Objects, arrays, values, and/or any combination thereof may be referred to as elements.

All elements within a structured file can be uniquely identified by a path. The path may be represented as a concatenation of the nested objects and arrays that can be used to locate a specific element within the JSON file. For instance, in FIG. 8A, JSON file 800 defines a "Person" object with various nested objects and arrays. Path structure 802 defines the corresponding paths for each, object, array, and value in JSON file 800. For instance, the person's first name ("John") can be found at "$.Person.First Name", the person's age (30) can be found at "$.Person.Age" and the person's degree ("BA") can be found at "$.Person.Education.Degree" (in this syntax, a path always begins with "$." and element names are separated by a "."). In some cases, a path may define a set of JSON objects with paths of interest.

Figure 8B:
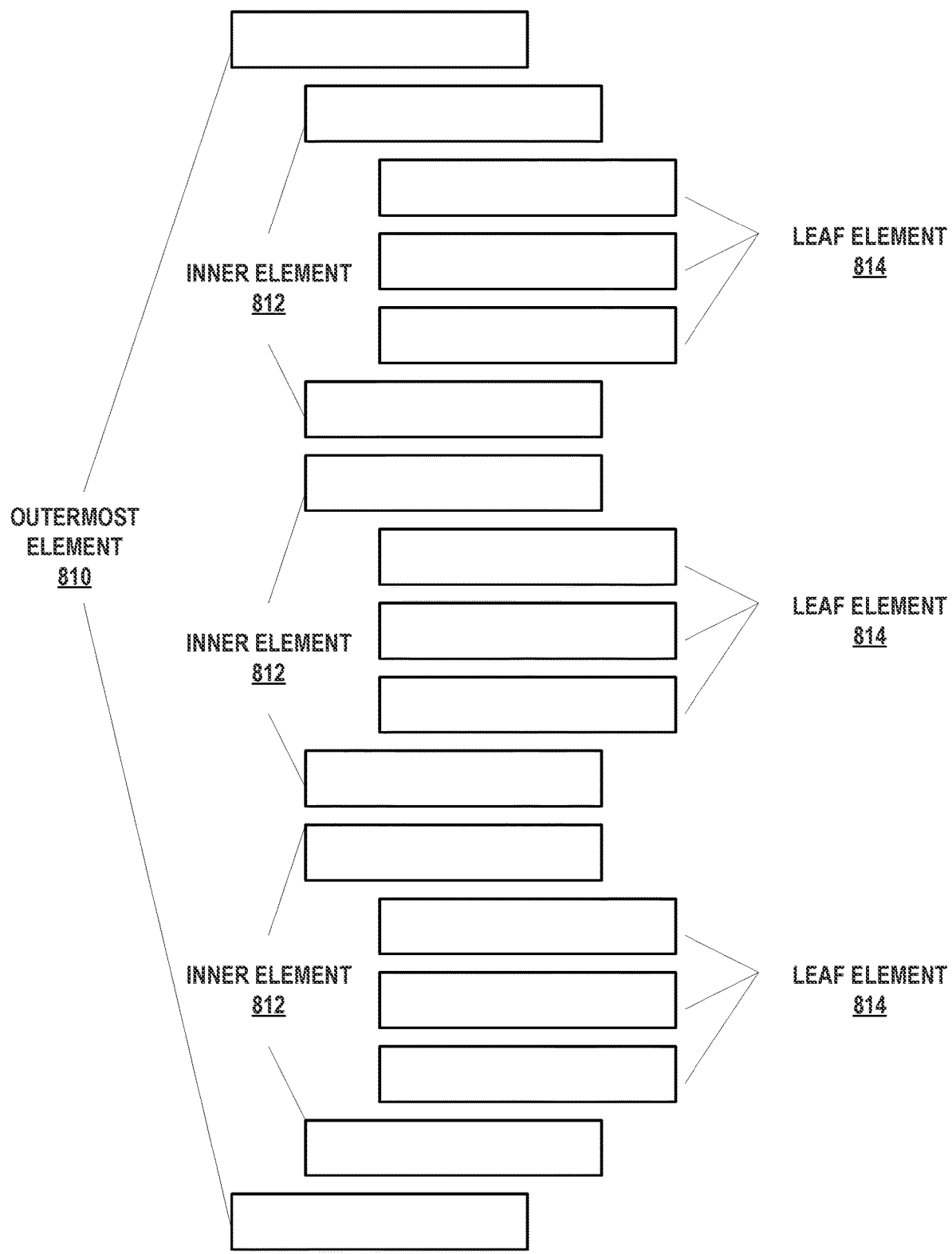
FIG. 8B depicts structural relationships between elements, in accordance with example embodiments.

FIG. 8B illustrates the relationship between elements at different levels of the hierarchy of a JSON file. The depicted JSON file includes an outer most element 810. The outermost element 810 includes three inner elements 812. Each inner element 812 includes three elements designated as leaf elements 814. The leaf elements 814 may correspond to scalar values rather than elements. The number of elements and leaf elements depicted in a particular element is merely illustrative and can be different. The elements at the different levels of the hierarchy may be referenced by a path.

Using element paths can be advantageous when parsing a JSON file, because not all elements may be of interest and paths can be used to define the elements that are of interest. For example, given objects of the type "Person" as defined in JSON file 800, the elements of interest might only be the person's first name, last name, age, city, and phone number (s). An application may be configured to extract just these values and write them to a file or a database table.

In order to acquire the values from a file with one or more "Person" objects, one or more parsers may be configured with the relevant paths as input. For instance, the parsers may be given the paths in configuration file 804, as well as direction to output the element values associated with these paths in some configured format. This would produce the corresponding output file 806.

In other words, the parser scanned JSON file 800 for the value associated with the path "$.Person.First Name", found "John", and wrote that to output file 806. Similarly, the parser scanned JSON file 800 for the value associated with the path "$.Person.Last Name", found "Doe", and wrote that to output file 806 prepended with a space character. This process continues until all paths in configuration file 804 for the full stream are parsed. Thus, if JSON file 800 contains another "Person" entry for Bill Smith, 42 years of age, living in Santa Clara with a phone number of 321 654-9987, that information would be written to output file 806 in a separate line of text (this line of text is shown italicized to reflect that the corresponding data is not shown in JSON file 800). This means that output file 806 may contain one line of text per "Person" defined in JSON file 800.

Alternatively or additionally, the output from the parser can be mapped to specific columns of one or more database tables. As an example, a database table with columns for first name, last name, age, city, and phone numbers could be defined, and configuration file 804 (or some other file or data structure) may contain a mapping from each path to a column. In this way, the database tables can be populated with the elements of interest from JSON file 800.

Notably, the paths in configuration file 804 may be stored in various ways and therefore an actual configuration file might not be required. For instance, the paths may be stored in application memory, a database, etc.

Figure 9:
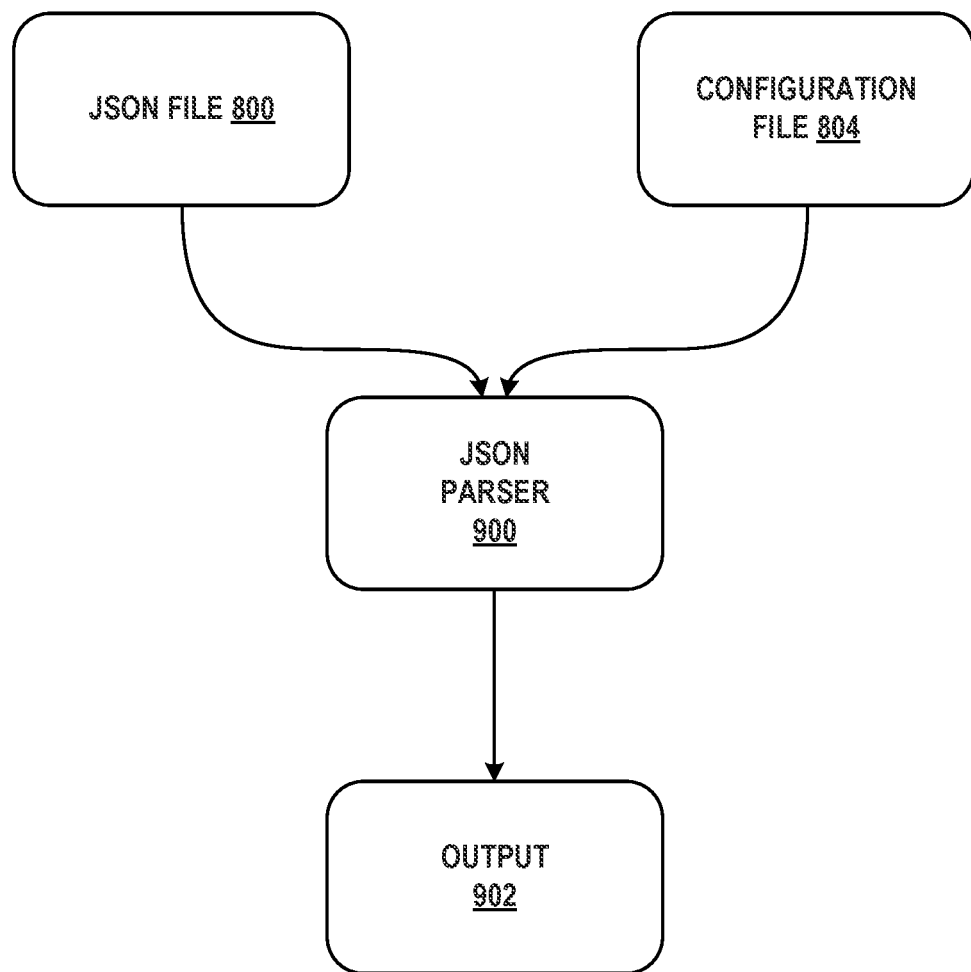
FIG. 9 depicts the input to and output from a parser, in accordance with example embodiments.

FIG. 9 summarizes this process. JSON parser 900 receives input from JSON file 800 and configuration file 804. As noted above, configuration file 804 may contain paths of interest that are defined in JSON file 800. Based on the content of these files, JSON parser 900 may produce output 902, which may be a representation of the content within JSON file 800 at the locations specified by the paths of interest. Output 902 may take the form of a file, entries in a database, or some other arrangement.

VII. Parallel Streaming Parsers

Figure 10:
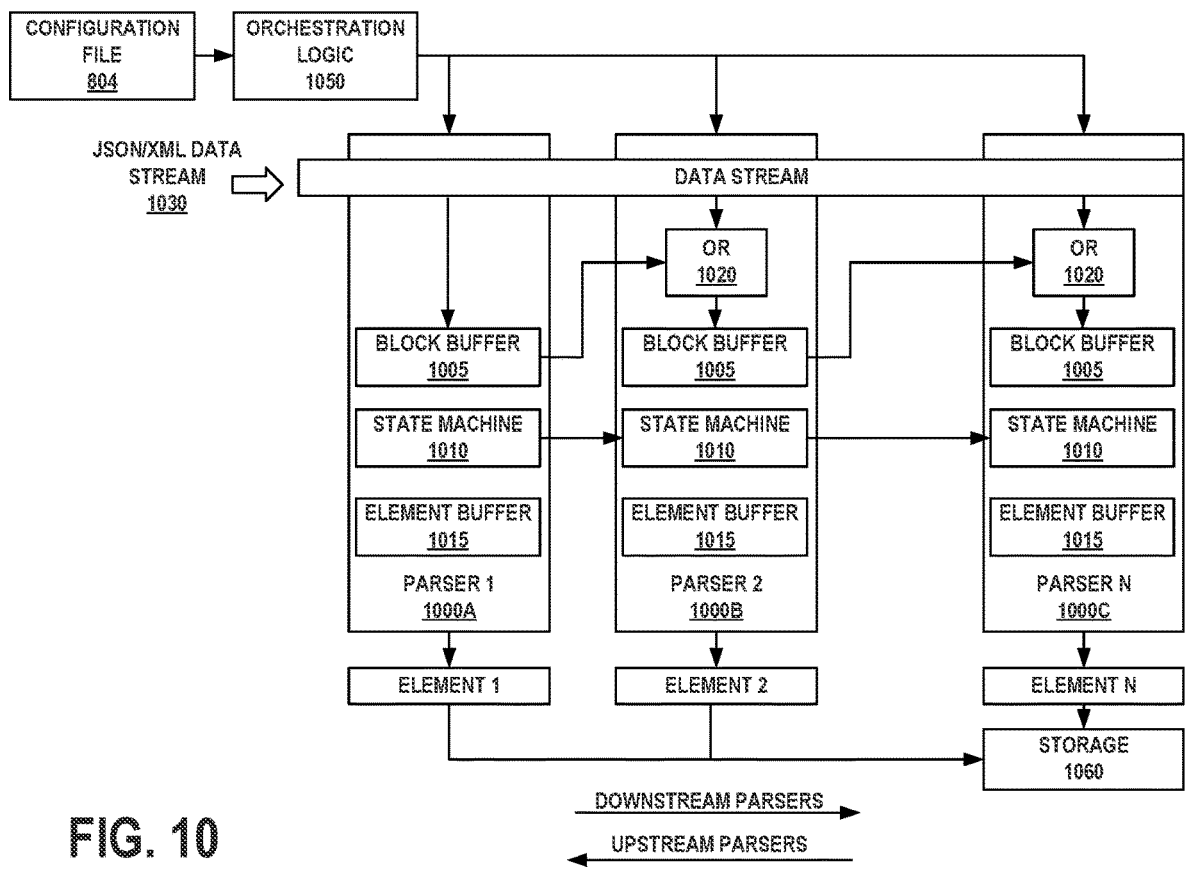
FIG. 10 is a logical representation of streaming parsers for performing parallel parsing operations, in accordance with example embodiments.

FIG. 10 is a logical representation of an exemplary group of streaming parsers 1000A-C that may be implemented by one or more processors 102 for performing parallel parsing operations on a data stream. As noted above, each parser 1000A-C may be associated with a search query that defines a hierarchical sequence of nodes within a string of data that are of interest such as "$.Person.First Name", "$.Person.Age", "$.Person.Education.Degree", etc. The format of the search query may be different and may depend on the type of data being queried. The queries may have been previously specified by one or more users of the receiving system and may be stored in a configuration file 804.

In some implementations, orchestration logic 1050 may be implemented by the processor 102 and may be configured to spawn instances of one or more parsers 1000A-C for each query, and/or to assign a search query to an existing instance of a parser 1000A-C. For example, the orchestration logic 1050 might spawn ten parsers to simultaneously search for elements associated with ten search queries. In addition, or alternatively, the orchestration logic 1050 may distribute the queries over a smaller number of parsers 1000A-C. This might be done, for example, to conserve computing recourses.

As noted above, the parsers 1000A-C may obtain data from the data stream in blocks in a pipelined fashion to facilitate simultaneous or near simultaneous processing of the blocks by the parsers 1000A-C. For example, a first parser 1000A may obtain data from the data stream in blocks from a sending device. The first parser 1000A may make the blocks available to a second parser 1000B. The second parser 1000B may in turn make the blocks available to a third parser 1000C. This arrangement may be extended to an arbitrary number of parsers. In this sense, a parser 1000A-C that makes blocks available to another parser 1000A-C is considered to be upstream from the other parser 1000A-C. Likewise, the parser 1000A-C that receives blocks from another parser is considered to be downstream from the other parser 1000A-C. This arrangement is indicated by the upstream/downstream arrow indicators in FIG. 10. As noted above, this arrangement facilitates performing N queries in an execution time of O(M), where M is the number of characters within the data. Note, while three parsers 1000A-C are illustrated, it is understood that a different number of parsers may be implemented, which is implied by the third parser 1000C being indicated as parser N.

As shown in FIG. 10, each parser 1000A-C includes a block buffer 1005, a state machine 1010, and an element buffer 1015. The second parser 1000B and any subsequent parsers may also include "OR" logic 1020. The details of these elements will be described in more detail below.

Each parser 1000A-C may be configured to receive blocks of data from a data stream 1030 that may collectively define a string of data, and to output elements of the string of data that are of interest as indicated by a respective search query. The data stream 1030 may include information in, for example, a JSON, XML, and/or other format that facilitates textual data-interchange between computer systems, as described above. In this regard, each parser 1000A-C may be associated with a search query to facilitate parallel searching of the data stream 1030 for different elements. The search queries would ordinarily be expected to be different and may be specified in the configuration file 804, as described above. The number of parsers, N, may generally correspond to the number of different search queries desired. It is contemplated, however, that a given parser could be configured to search multiple search queries or that different parsers may apply the same query to the data stream 1030. Details of the processing of the blocks to search for elements is described in more detail in FIG. 12.

To facilitate coordinating operations between parsers 1000A-C, the parsers 1000A-C may utilize one or more interprocess communication resources provided by the operating system to communicate information such as state information, block data, a block address reference, etc. For example, the operating system may provide a mechanism that facilitates sending messages that include the information between the parsers 1000A-C. In addition, or alternatively, the parsers 1000A-C may utilize shared memory to communicate the information. In this regard, the operating system may provide suitable memory locking mechanisms to facilitate simultaneous access, by the parsers 1000A-C, to the memory.

As described in more detail below, the parsers 1000A-C are generally configured so that a downstream parser receives blocks of the data stream 1030 from its nearest upstream parser. In this regard, a downstream parser may copy the block from the upstream parser or obtain a reference to the block from the upstream parser to save memory. The parser furthest upstream that is still processing a search is responsible for reading blocks from the data stream 1030. For example, as shown in FIG. 10, if the first parser 1000A is processing a search, it would be responsible for obtaining blocks from the data stream 1030. The second parser 1000B, which is downstream of the first parser 1000A, would then be configured to obtain blocks from the block buffer 1005 of the first parser 1000A.

If the first parser 1000A is finished processing a given block, but the second parser 1000B has not yet obtained and processed the block, the second parser 1000B may obtain the block from the first parser. On the other hand, if the first parser 1000A is finished searching the data stream and finished processing a given block and the second parser 1000B already obtained and processed the block and determines that a next block is needed, the second parser 1000B may obtain the next block from the data stream 1030.

Likewise, a parser downstream of the second parser (e.g., parser N 1000C) is configured to obtain blocks from either (a) the block buffer 1005 of the second parser 1000B, or (b) the data stream 1030. "OR" logic 1020 of each parser 1000A-C determines whether the block should be obtained from the nearest upstream parser or the data stream 1030.

Figure 11:
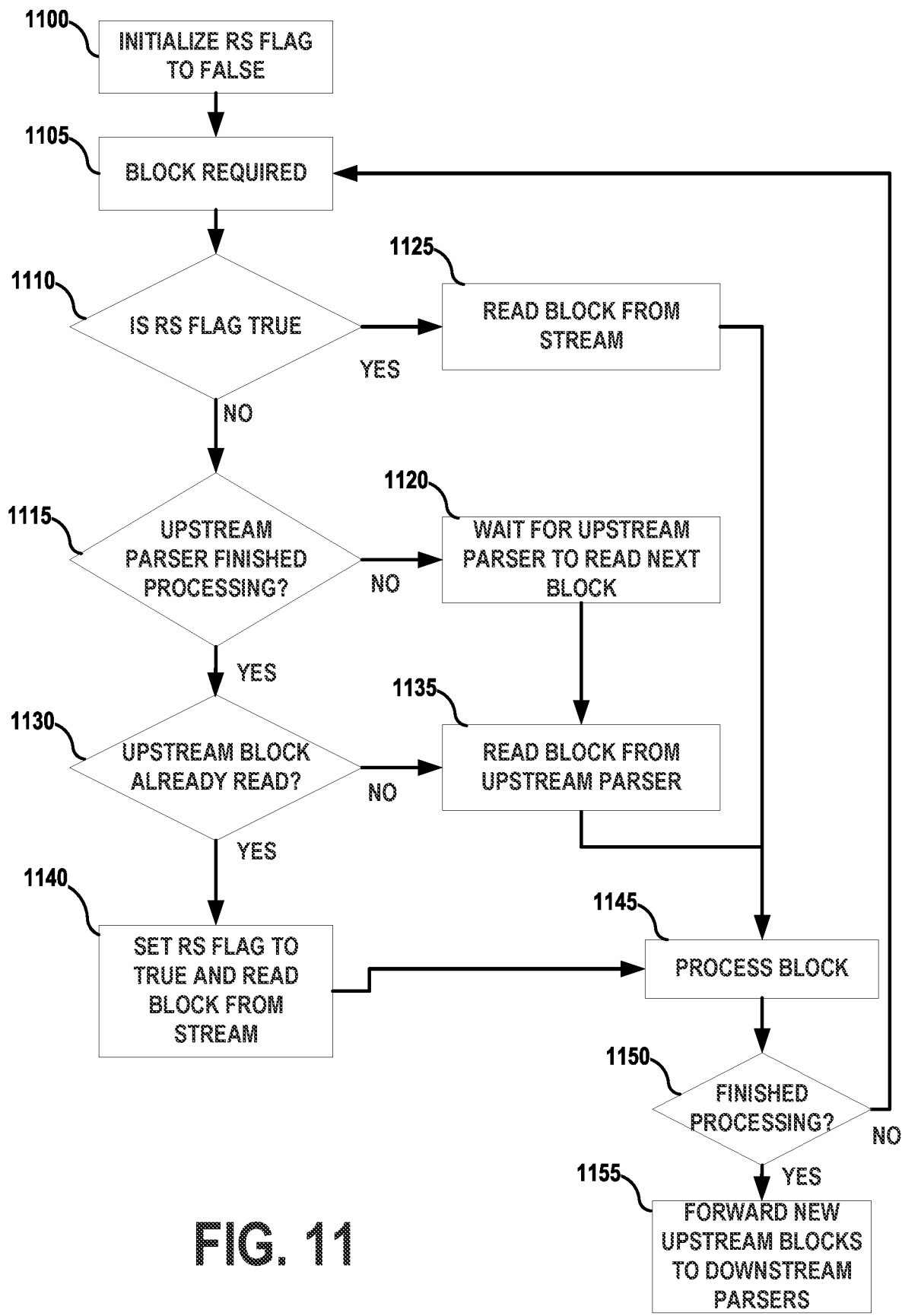
FIG. 11 illustrates operations performed by a downstream parser in obtaining blocks, in accordance with example embodiments.

FIG. 11 illustrates operations performed by a parser in obtaining blocks from either another parser or the data stream 1030. The operations may be implemented via instruction code stored in memory 104 that resides within the computing device 100 configured to cause the processor 102 to perform the operations illustrated in the figures and discussed herein. For purposes of this explanation, it will be assumed that the first parser 1000A is an upstream parser and the second parser 1000B is a downstream parser. It will further be assumed that the first parser 1000A (upstream parser) is currently, or was previously tasked, with obtaining blocks from the data stream 1030. Note that the most upstream parser (i.e., first parser 1000A) may operate in a different manner than the other parsers 1000B-C. In particular, the most upstream parser 1000A may be configured to only receive blocks from the data stream 1030. That is, the most upstream parser may not include the "OR" logic 1020.

As previously noted, the downstream parser may obtain blocks from either the nearest upstream parser or directly from the data stream 1030. Initially, however, the downstream parser obtains blocks from the nearest upstream parser. Therefore, at operation 1100, the downstream parser may be initially configured to obtain blocks for processing from a nearest upstream parser. For example, the downstream parser may be associated with a read-from-stream flag (RS flag) that, when set to false, causes the downstream parser to obtain blocks from the nearest upstream parser.

At operation 1105, the downstream parser may determine that a new block is required.

At operation 1110, the downstream parser may determine whether the RS flag is set. That is, the downstream parser determines whether to check the nearest upstream parser for a block or whether to obtain the next block directly from the data stream 1030.

If the RS flag is not set (e.g., set to false), then at operation 1115, the downstream parser may determine via an interprocess communication supported by the operating system whether the upstream parser has finished processing operations. That is, the downstream parser determines whether the upstream parser finished obtaining all the elements specified by the search query associated with the upstream parser.

If the upstream parser has not finished processing operations, then at operation 1120, the downstream parser may wait for the upstream parser to read a next block. When the next block is read by the upstream parser, the downstream parser may read the block at operation 1135 and may process the block at operation 1145. That is, the downstream parser may search the block for elements associated with the search query associated with the downstream parser.

In some implementations, the identified elements may, for example, be stored to a database. In this regard, the downstream parser may store the elements in a non-blocking manner. That is, the downstream parser may store each identified element one at a time. After storing each element, the downstream parser may broadcast a notification via an interprocess communication resource of the operating system to notify one or more other processes that an element has been stored. The other process(es), which may be operating on a thread different than the downstream parser, may then obtain the element(s) from the database. In addition, or alternatively, one or more values associated with the elements may be sent within the message.

If at operation 1150, the downstream parser is not finished with parsing/processing operations, then the operations from operation 1105 may repeat. Otherwise, at operation 1155, the downstream parser may continue to read and forward or make available any blocks read by the nearest upstream parser if the nearest upstream parser is still processing or obtaining blocks. For example, in some cases, the upstream parser may be configured to search for a first type of element and the downstream parser may be configured to search for a second type of element that occurs earlier in the data stream 1030 than the first type of element. In this case, the downstream parser may finish processing before the upstream parser. The upstream parser may still be tasked with obtaining new blocks from the data stream 1030. To facilitate processing by parsers that are downstream of the downstream parser, the downstream parser may forward or make available new blocks read by the nearest upstream parser to parsers that are downstream of the downstream parser.

Returning to operation 1115, if the downstream parser determines that the nearest upstream parser has finished parsing operations, then at operation 1130, the downstream parser determines whether the block currently residing in the nearest upstream parser was read by the downstream parser. If the downstream parser has not read the block from the nearest upstream parser, the operations from operation 1135 may proceed.

If at operation 1130, the downstream parser determines that the block was previously read from the nearest upstream parser, then at operation 1140, the downstream parser may, for example, set the RS flag to true to indicate to the downstream parser that subsequent block reads are to be performed by the downstream parser. The downstream parser may then obtain the next block from the data stream 1030. The operations from operation 1145 may then repeat.

After processing the block at operation 1145, if at operation 1150 the downstream parser is not finished processing and requires an additional block, the operations may repeat from operation 1105.

Because the RS flag is set at operation 1140, at operation 1110, the downstream parser will proceed with obtaining future blocks from the data stream 1030, as indicated by operation 1125.

Figure 12:
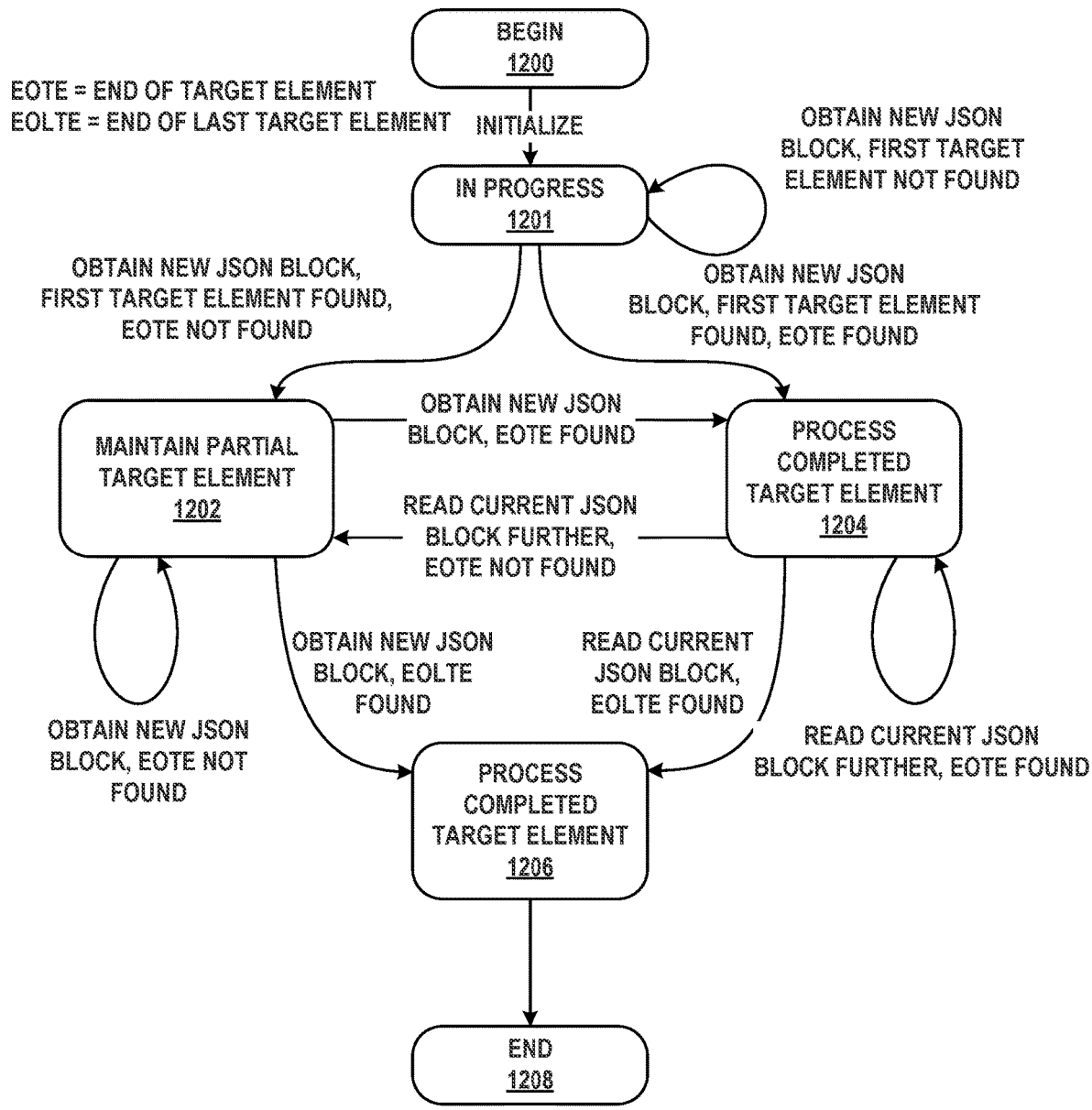
FIG. 12 depicts states and state transitions of state machines of the streaming parsers, in accordance with example embodiments.

FIG. 12 depicts states and state transitions of the state machines 1010 of the respective parsers 1000A-C. The state machines 1010 of the parsers 1000A-C transition through the illustrated states when processing blocks.

As noted above, in an embodiment, each parser may receive a JSON formatted data stream (e.g., by way of a network connection) in blocks, and may processes each block accordingly. In some embodiments, the parser may be parsing one block while receiving another block.

In the case of JSON, even if the parser can control the size of the blocks to some extent, the parser likely cannot control whether a block ends with complete a JSON element. For example, an object, array, or value may begin in one block and end in a subsequent block. Thus, the parser should be able to handle these situations.

In the context of FIG. 12, the acronym EOTE is used to refer to the end of a target element (e.g., an end brace or end bracket), and the acronym EOLTE is used to refer to the end of the last target element in the JSON file (e.g., an end brace or end bracket of the last target element in the file with any items of interest).

The parser begins in state 1200. For example, the parser may read a configuration file containing a specification of one or more target element queries that may define paths and/or paths of interest, among other activities. As the parser initializes, it transitions to state 1201. While in state 1201, the parser obtains and stores a block of the file 800 in the data block buffer 1005. After or while storing the block, the parser searches the stored block for the first target element indicated by the target element path. If the position indicated by the target element path is not found in the currently stored block, the parser obtains the next block and overwrites the first block in the block buffer 1005 with the next block. The parser then searches the stored data for the first target element indicated by the target element path. These operations repeat until a block of the file containing the position indicated by the target element path is found, as indicated by the self-transition.

After obtaining a block of the JSON file containing the position indicated by the target element path, the parser determines whether there is an EOTE found in the current block. If an EOTE is not found, the parser transitions to state 1202. If an EOTE is found, the parser transitions to state 1204.

In state 1202, the most-recently obtained block did not yield enough data to form a complete target element. Therefore, the parser maintains the partial target element received so far in the element buffer 1015, and then obtains the subsequent block. There are three possible transitions from state 1202. If the subsequent block includes an EOTE, the parser transitions to state 1204. If the subsequent block contains an EOLTE (and no other EOTE), the parser transitions to state 1206. If the subsequent block ends without an EOTE being found, the parser stays in state 1202 (a self-transition) and then obtains yet another block.

In state 1204, the most-recently obtained block yielded enough data to form at least one complete target element. The parser processes the first of these complete elements(s) (e.g., provides a map of key-value pairs within the target element). The processed target element is then removed from the element buffer 1015. There are three possible transitions from state 1204. If the current block includes another EOTE, the parser stays in state 1204 (a self-transition) and processes a subsequent target element. If the current block does not include another EOTE, the parser transitions to state 1202. If the current block contains an EOLTE (and no other EOTE), the parser transitions to state 1206.

When the parser is in state 1206, the EOLTE has been found, which also indicates that there are no more target elements to be processed past this block. Thus, the parser processes the final target element and then transitions to state 1208 where the parsing terminates.

As noted above, an end-of-file (EOF) can occur at any point during the processing of a JSON file. Upon reading an EOF, the parser may immediately terminate or process any complete target elements and then terminate.

Figure 13A:
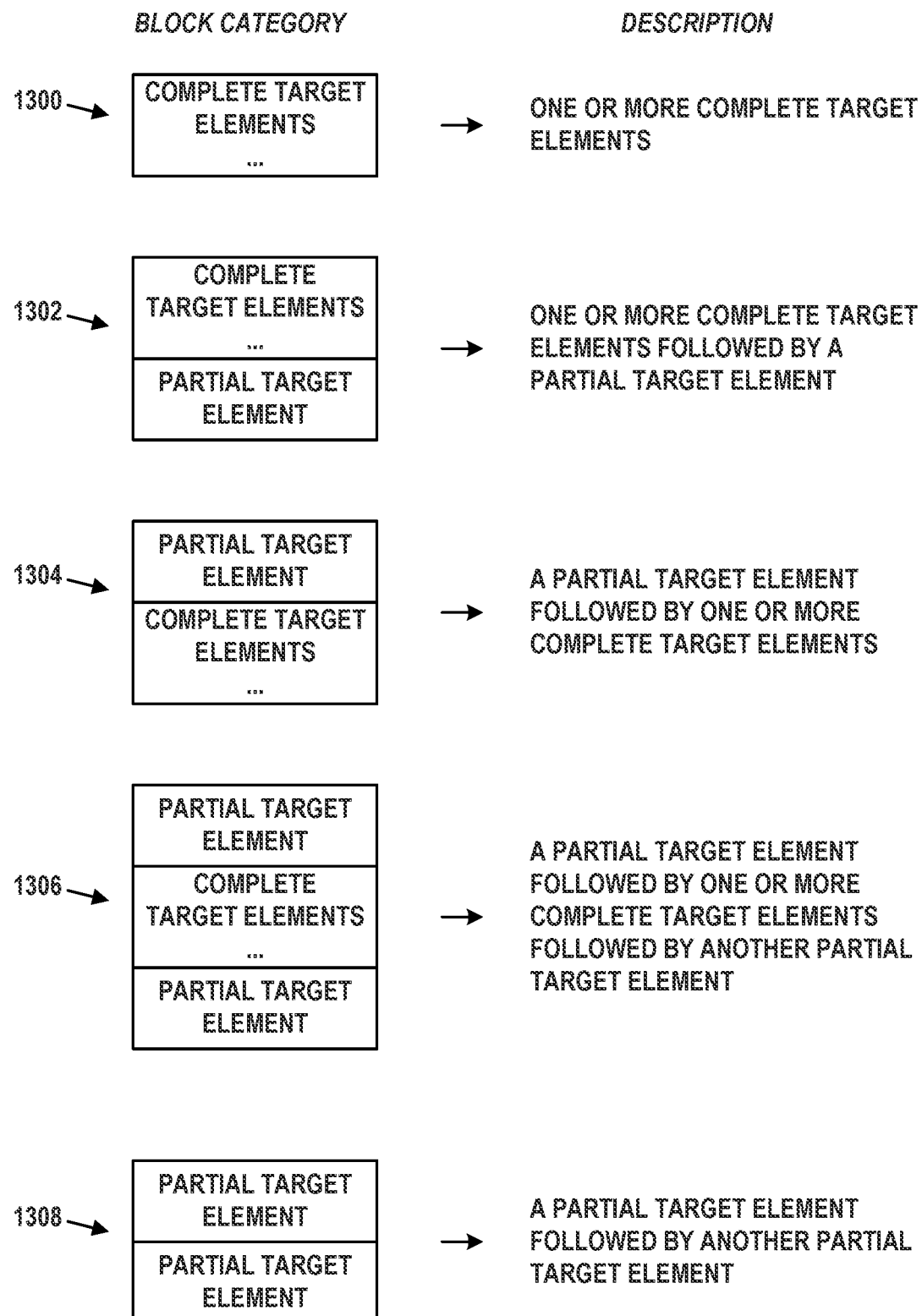
FIG. 13A depicts various arrangements of elements within a block of a textual data-interchange file, in accordance with example embodiments.
Figure 13B:
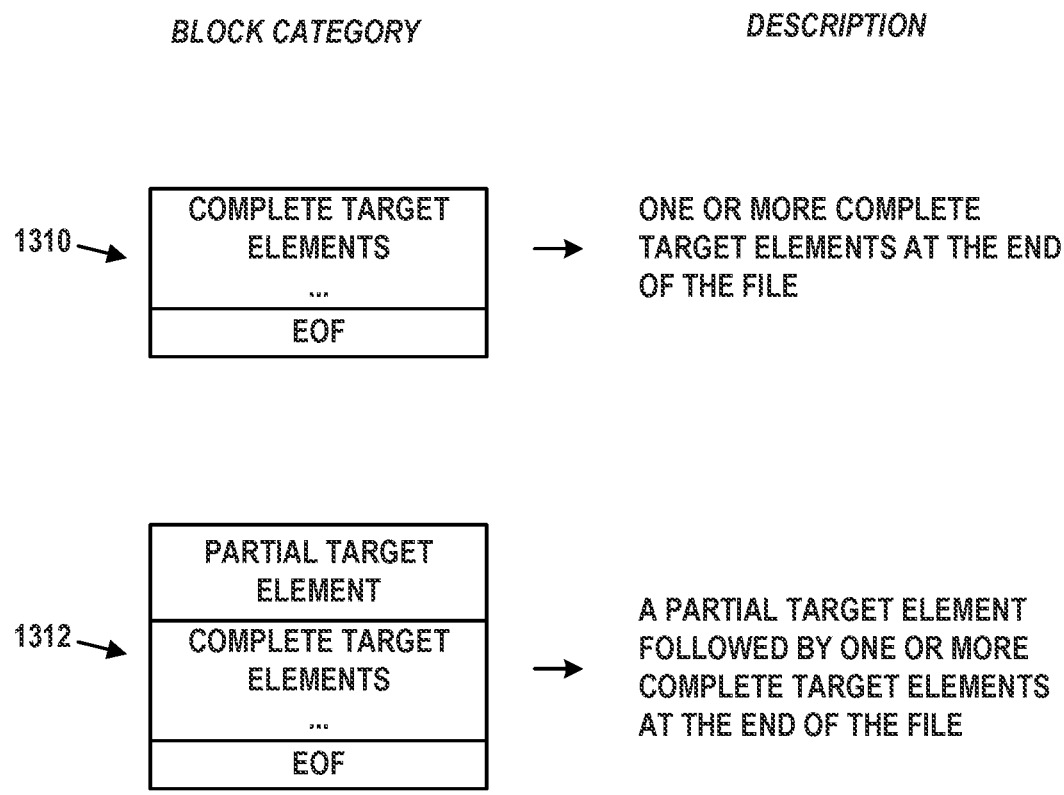
FIG. 13B also depicts various arrangements of elements within a block of a textual data-interchange file, in accordance with example embodiments.

FIGS. 13A and 13B further illustrate the contents of blocks that the parser would handle. Several categories of blocks are introduced and the parsing of each is discussed. Note that the categories discussed herein might not be exhaustive or complete, and other categories may exist. Since block size and target element size may vary, there is no guarantee that an integral number of target elements may be contained within each block. Thus, the parser should handle at least some situations where target elements are split across blocks. In FIGS. 13A and 13B, the block category is on the left and a description thereof is on the right.

Category 1300 is for blocks that contain only one or more complete target elements and no partial target elements. After parsing such a block, the elements of interest (e.g., as defined by paths in a configuration file) of each of these target elements are provided as output.

Category 1302 is for blocks that contain one or more complete target elements followed by a partial target element. After parsing such a block, the elements of interest of each of the complete target elements are provided as output, and the partial target element (or elements of interest therein) may be placed in the target element buffer 1015 of the parser. It is assumed that at least some of the remainder of the partial target element will be present in the next block.

Category 1304 is for blocks that contain a partial target element followed by one or more complete target elements. It is assumed that another partial target element corresponding to the partial target element of the block is in temporary storage. These two partial target elements are concatenated to form a complete target element. The elements of interest of each of the complete target elements (including the one just formed) are provided as output.

Category 1306 is for blocks that contain a first partial target element followed by one or more complete target elements followed by a second partial target element. It is assumed that another partial target element corresponding to the first partial target element of the block is in temporary storage. These two partial target elements are concatenated to form a complete target element. The elements of interest of each of the complete target elements (including the one just formed) are provided as output. The second partial target element of the block (or elements of interest therein) is placed in temporary storage. It is assumed that some or the rest of the second partial target element will be present in the next block.

Category 1308 is for blocks that contain a first partial target element followed by a second partial target element. It is assumed that another partial target element corresponding to the first partial target element of the block is in temporary storage. These two partial target elements are concatenated to form a complete target element, and the elements of interest in this complete target element are provided as output. The second partial target element of the block (or elements of interest therein) is placed in temporary storage. It is assumed that some or the rest of the second partial target element will be present in the next block.

It should be noted that it is possible for an entire block to contain a partial target element that began in a previous block and ends in a subsequent block. This scenario when the target element size exceeds the block size, and is not specifically depicted in FIG. 13A. Nonetheless, in such a scenario, this partial target element would be added to a corresponding partial target element already in temporary storage, and then the next block would be processed.

Turning to FIG. 13B, category 1310 is for blocks that contain one or more complete target elements followed by an EOF. After parsing such a block, the elements of interest of each of these target elements are provided as output, and then the parsing ends.

Category 1312 is for blocks that contain a partial target element followed by one or more complete target elements. It is assumed that another partial target element corresponding to the partial target element of the block is in temporary storage. These two partial target elements are concatenated to form a complete target element. The elements of interest of each of the complete target elements (including the one just formed) are provided as output. Then, the parsing ends.

While it is possible for the last target element of a file to be a partial target element (e.g., the file ends in the middle of a target element), this scenario would likely be considered an error. Thus, the partial target element would likely be discarded or logged for debugging purposes.

Based on these observations, a bound on the amount of memory used by a streaming parser can be derived as follows. The parser maintains, in temporary storage, an internal buffer the contents of which include recently received blocks, and the size of which may be chosen such that: (1) it can contain at least one complete target element, and (2) is optimally an integral multiple of the block size. It is assumed that the parser can control the number of blocks being received while the current block is being processed by reading at most one block from its networking stack at a time (and as noted above, the networking stack can limit the amount of storage it uses for incoming blocks by limiting available TCP/IP capacity).

Thus, temporary storage for one block may be required at the parser. Further, to handle partial elements, temporary storage for the internal buffer may be required at the parser. Therefore, the upper bound on memory usage by the streaming parser is I+B, where I is the internal buffer size and B is the block size. In contrast, a conventional, non-streaming parser will require memory usage on the order of nB, where n is the number of blocks in the file. In the vast majority of real-world scenarios, n is expected to be greater than 10, while I is expected to be a small fraction of the file size. Therefore, the embodiments herein are significantly more memory efficient than conventional techniques.

VIII. Example Operations

Figure 14:
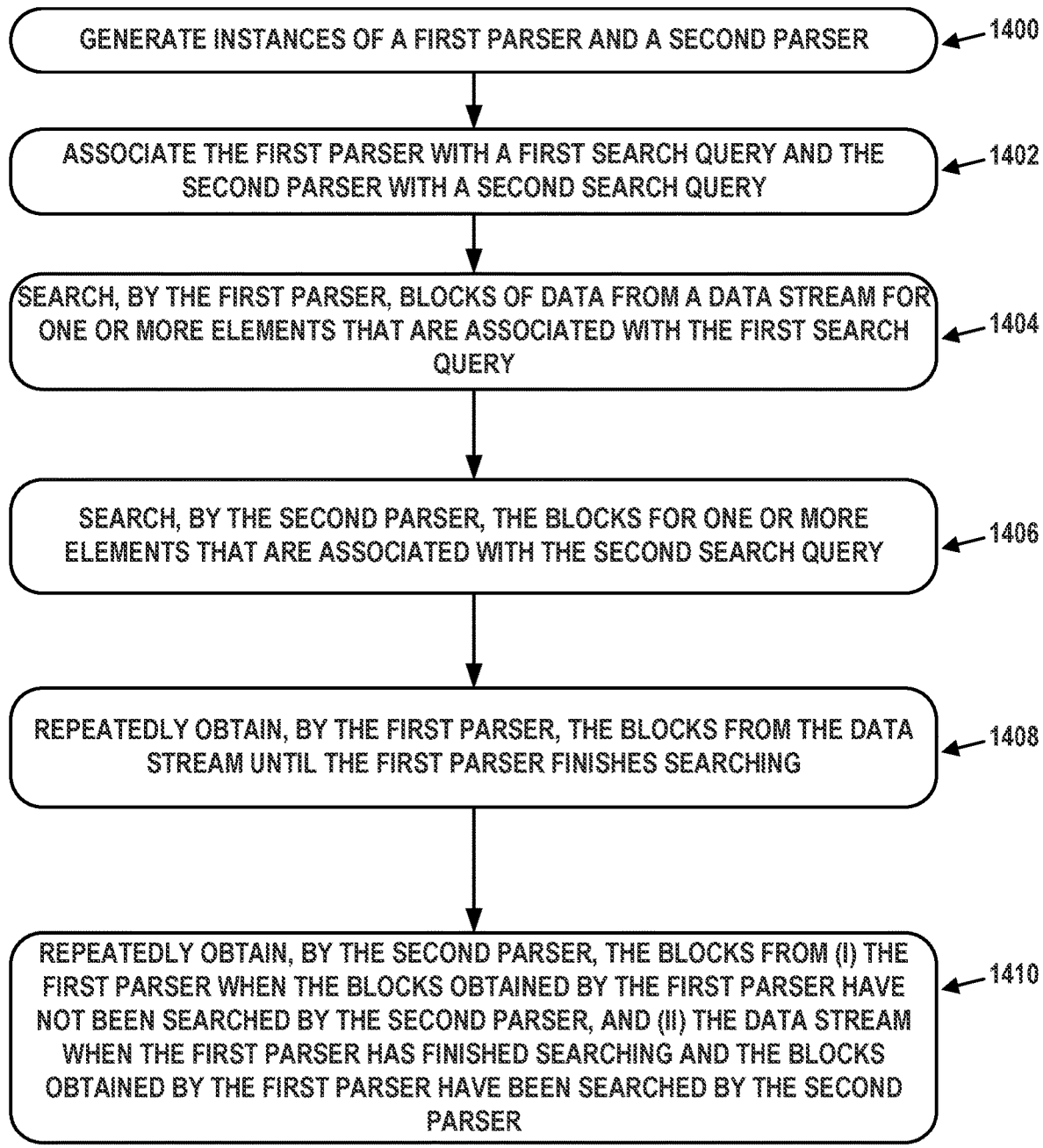
FIG. 14 depicts a flow chart, in accordance with example embodiments.

FIG. 14 is a flow chart illustrating an example embodiment. The process illustrated by FIG. 14 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 14 may be simplified by the removal of any one or more of the features shown therein. Further, these embodiments may be combined with features, aspects, and/or implementations of any of the previous figures or otherwise described herein.

In general, the steps depicted in FIG. 14 represent the manner by which a downstream parser obtains blocks of information. The blocks may be obtained from an upstream parser when the upstream parser is actively obtaining blocks. The blocks may be obtained from a data stream when the upstream parser is no longer obtaining blocks.

Step 1400 may involve generating instances of a first parser and a second parser.

Step 1402 may involve associating the first parser with a first search query and the second parser with a second search query.

Step 1404 may involve searching, by the first parser, the blocks for one or more elements that are associated with the first search query.

Step 1406 may involve searching, by the second parser, the blocks for one or more elements that are associated with the second search query.

Step 1408 may involve repeatedly obtaining, by the first parser, the blocks from the data stream until the first parser finishes searching.

Step 1410 may involve repeatedly obtaining, by the second parser, the blocks from (i) the first parser when the blocks obtained by the first parser have not been searched by the second parser and (ii) the data stream when the first parser has finished searching and the blocks obtained by the first parser have been searched by the second parser.

In some embodiments, the second search query is different from the first search query. Further, the elements associated with the second search query may occur in the data stream before elements associated with the first search query.

In some embodiments, a third parser instance is generated. The third parser is associated with a third search query. The third parser repeatedly obtains blocks from the second parser when the blocks obtained by the second parser have not been searched by the third parser. The third parser repeatedly obtains blocks from the data stream when the first parser and the second parser have finished searching and the blocks obtained by the second parser have been searched by the third parser. The third parser searches the obtained blocks for elements within each block that are associated with third search query.

In some embodiments, when the first parser is not finished searching and the second parser is finished searching, the second parser may continue to repeatedly obtain blocks from the first parser. The second parser may forward or make available the blocks to the third parser to allow the third parser to parse/process the blocks.

In some embodiments, the second parser obtains a block from the first parser by either copying the block from the first parser or obtaining a reference to a memory location of the block from the first parser.

In some embodiments, the first and second parsers are configured to simultaneously search a particular block. That is, the first and second parsers may be searching for elements associated with respective queries from the same block.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
   a processor; and
   a non-transitory memory, accessible by the processor and storing instructions that, when executed by the processor, cause the processor to perform operations comprising:
   associating a first parser with a first search query according to a first association;
   associating a second parser with a second search query according to a second association;
   searching, via the first parser, blocks of data of a data stream for a first set of elements based on the first search query and the first association;

providing, via the first parser, the blocks of data to the second parser, and searching, via the second parser, the blocks of data for a second set of elements based on the second search query and the second association, wherein the first set of elements is different from the second set of elements, and wherein the second parser is configured to (i) obtain the blocks of data from the first parser when the blocks of data obtained by the first parser have not been searched by the second parser, and (ii) obtain the blocks of data from the data stream when the first parser has finished searching and all of the blocks of data obtained by the first parser have been searched by the second parser; and storing the first set of elements and the second set of elements in the non-transitory memory.

2. The system of claim 1, wherein the operations comprise:

receiving the first search query and the second search query; and in response to receiving the first search query and the second search query:
generating the first parser; and
generating the second parser.

3. The system of claim 1, wherein the first parser and the second parser are controlled by the processor to search a particular block of data from the blocks of data simultaneously.

4. The system of claim 1, wherein the second parser is configured to recurringly obtain the blocks of data from the first parser and recurringly obtain the blocks from the data stream.

5. The system of claim 1, wherein the second set of elements associated with the second search query occur in the data stream before the first set of elements associated with the first search query.

6. The system of claim 1, wherein the instructions cause the processor to perform operations that include:

associating a third parser with a third search query according to a third association;

providing, via the second parser, the blocks of data to the third parser; and searching, via the third parser, the blocks of data for a third set of elements based on the third search query and the third association, wherein the third set of elements is different than the first set of elements and the second set of elements.

7. The system of claim 6, wherein the instructions cause the processor to perform operations that include:

controlling the third parser to: (i) recurringly obtain the blocks of data from the second parser when the blocks of data obtained by the second parser have not been searched by the third parser, and (ii) recurringly obtain the blocks of data from the data stream when the first parser and the second parser have finished searching and all of the blocks of data obtained by the second parser have been searched by the third parser.

8. The system of claim 1, wherein the instructions cause the processor to perform operations that include outputting the first set of elements found by the first parser as a first result of searching and the second set of elements found by the second parser as a second result of the searching to a database, file, or calling process implemented by the processor.

9. The system of claim 1, wherein each element within the first set of elements is associated with a respective path, wherein the respective path corresponds to a representation of one or more objects, one or more arrays, or both, that locate a specific element within the first set of elements.

10. A method comprising:

at an electronic device including a processor and a non-transitory memory:

associating a first parser with a first search query according to a first association;

associating a second parser with a second search query according to a second association;

searching, via the first parser, blocks of data of a data stream for a first set of elements based on the first search query and the first association;

providing, via the first parser, the blocks of data to the second parser, and searching, via the second parser, the blocks of data for a second set of elements based on the second search query and the second association, wherein the first set of elements is different from the second set of elements;

controlling the second parser to (i) obtain the blocks of data from the first parser when the blocks of data obtained by the first parser have not been searched by the second parser, and (ii) obtain the blocks of data from the data stream when the first parser has finished searching and all of the blocks of data obtained by the first parser have been searched by the second parser; and storing the first set of elements and the second set of elements in the non-transitory memory.

11. The method of claim 10, comprising:

associating a third parser with a third search query according to a third association;

providing, via the second parser, the blocks of data to the third parser; and searching, via the third parser, the blocks of data for a third set of elements based on the third search query and the third association, wherein the third set of elements is different than the first set of elements and the second set of elements.

12. The method of claim 11, comprising:

controlling the second parser to (i) recurringly obtain the blocks of data from the first parser and (ii) repeatedly obtain the blocks of data from the data stream; and controlling the third parser to (i) recurringly obtain the blocks of data from the second parser when the blocks of data obtained by the second parser have not been searched by the third parser, and (ii) repeatedly obtain the blocks of data from the data stream when the first parser and the second parser have finished searching and all of the blocks of data obtained by the second parser have been searched by the third parser.

13. The method of claim 11, comprising:

receiving the first search query, the second search query, and the third search query; and in response to receiving the first search query, the second search query, and the third search query:
generating the first parser;
generating the second parser; and
generating the third parser.

14. The method of claim 10, comprising outputting the first set of elements found by the first parser as a first result of searching and the second set of elements found by the second parser as a second result of the searching to a database, file, or calling process implemented by the processor.

15. The method of claim 10, wherein each element within the first set of elements and the second set of elements is associated with a respective path, wherein the respective path corresponds to a representation of one or more objects, one or more arrays, one or more values, or any combination thereof, that locate a specific element within the first set of elements or the second set of elements.

16. An article of manufacture including a non-transitory computer-readable medium, having stored thereon program instructions that, when executed by a processor, cause the processor to perform operations comprising:
associating a first parser with a first search query according to a first association;
associating a second parser with a second search query according to a second association;
searching, via the first parser, blocks of data of a data stream for a first set of elements based on the first search query and the first association;
providing, via the first parser, the blocks of data to the second parser, and searching, via the second parser, the blocks of data for a second set of elements based on the second search query and the second association, wherein the first set of elements is different from the second set of elements;
controlling the second parser to (i) obtain the blocks of data from the first parser when the blocks of data obtained by the first parser have not been searched by the second parser, and (ii) obtain the blocks of data from the data stream when the first parser has finished searching and all of the blocks of data obtained by the first parser have been searched by the second parser; and
storing the first set of elements and the second set of elements in the non-transitory memory.

17. The article of manufacture of claim 16, wherein the instructions are configured to cause the processor to perform operations that include:
associating a third parser with a third search query according to a third association;
providing, via the second parser, the blocks of data to the third parser; and
searching, via the third parser, the blocks of data for a third set of elements based on the third search query and the third association, wherein the third set of elements is different than the first set of elements and the second set of elements.

18. The article of manufacture of claim 17, wherein the instructions are configured to cause the processor to perform operations that include:
controlling the second parser to (i) recurringly obtain the blocks of data from the first parser and (ii) repeatedly obtain the blocks of data from the data stream; and
controlling the third parser to (i) recurringly obtain the blocks of data from the second parser when the blocks of data obtained by the second parser have not been searched by the third parser, and (ii) repeatedly obtain the blocks of data from the data stream when the first parser and the second parser have finished searching and all of the blocks of data obtained by the second parser have been searched by the third parser.

19. The article of manufacture of claim 16, wherein the instructions are configured to cause the processor to perform operations that include outputting the first set of elements found by the first parser as a first result of searching and the second set of elements found by the second parser as a second result of the searching to a database, file, or calling process implemented by the processor.

20. The article of manufacture of claim 16, wherein each element within the first set of elements and the second set of elements is associated with a respective path, wherein the respective path corresponds to a representation of one or more objects, one or more arrays, one or more values, or any combination thereof, that locate a specific element within the first set of elements or the second set of elements.

* * * * *